Dec. 1, 1931.  V. J. WHITNEY  1,834,440
ELEVATOR BRAKE
Filed Sept. 23, 1929   2 Sheets-Sheet 1

INVENTOR
Vincent J. Whitney
John G. Chainsmith
ATTORNEY

Dec. 1, 1931.  V. J. WHITNEY  1,834,440
ELEVATOR BRAKE
Filed Sept. 23, 1929  2 Sheets-Sheet 2

INVENTOR
Vincent J. Whitney
John A. Naismith
ATTORNEY

Patented Dec. 1, 1931

1,834,440

UNITED STATES PATENT OFFICE

VINCENT J. WHITNEY, OF SAN FRANCISCO, CALIFORNIA

ELEVATOR BRAKE

Application filed September 23, 1929. Serial No. 394,630.

This invention relates particularly to an automatic braking mechanism for dumbwaiters.

It is one object of the invention to provide a mechanism of the character indicated that will be highly efficient in positively and automatically controlling the movement of a counterbalanced elevator in either direction.

It is also an object of the invention to provide a device of the character indicated that will be strong and durable, economical to manufacture, simple in form and construction, and highly efficient in its practical application.

Figure 1:
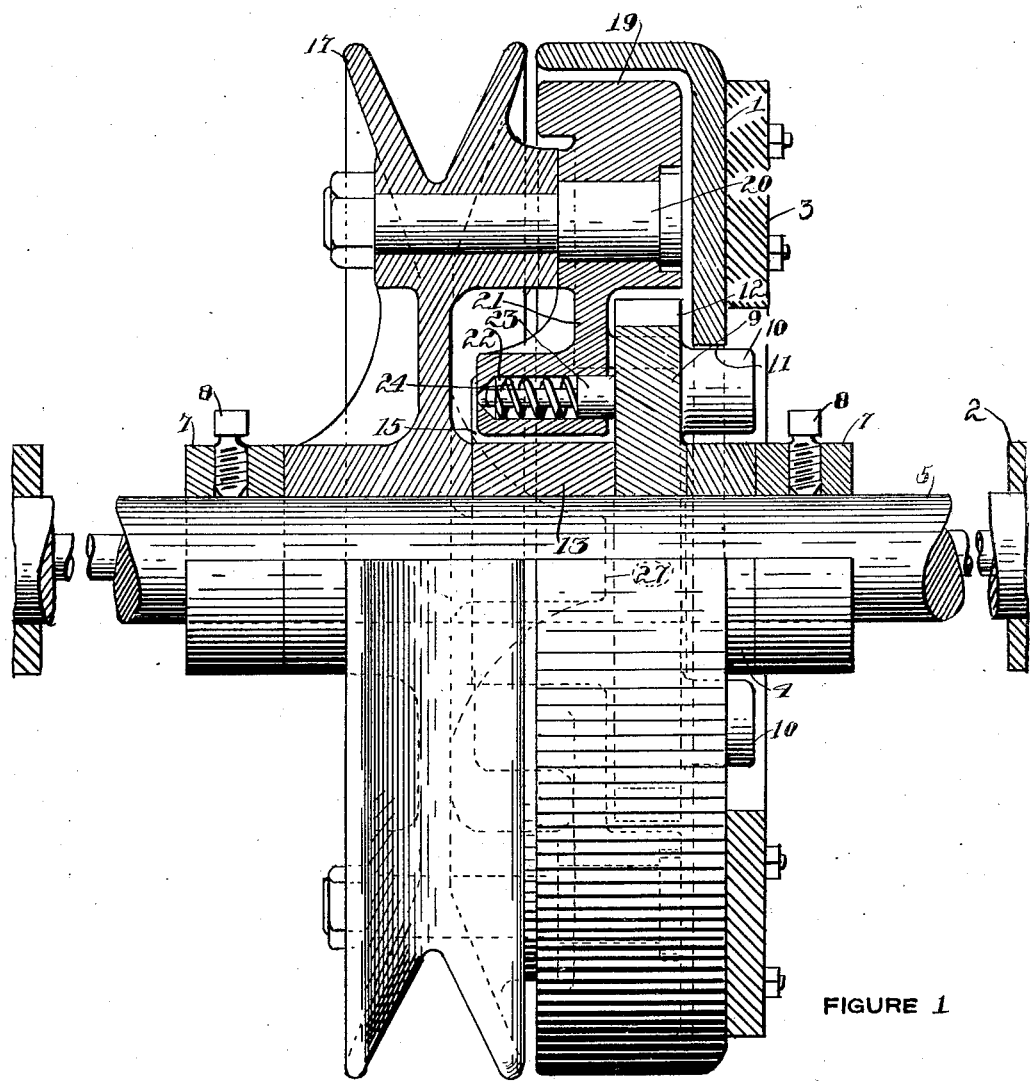
Figure 1 is a side elevation of the device, partly in section.

Referring now more particularly to the drawings, I show at 1 a housing that is rigidly held against movement relative to its supporting framework 2 in any suitable manner as indicated at 3. This case is provided with a central hub portion 4 in which is revolubly mounted an operating shaft 5 fitted with any suitable operating means, and collars 7 held in position by set screws 8.

At 9 is shown a plate concentrically mounted relative to the shaft 5 and having pins 10 formed thereon to engage orifices 11 in the case or housing 1 to prevent its rotation. Formed on the plate 9 are a number of spaced peripheral stops 12 in the present case eight in number and uniformly spaced.

A collar 13 is keyed to the shaft 5 as at 14 to rotate therewith adjacent the plate 9. This collar has four peripheral lugs formed thereon as at 15 in such a manner as to provide four intervening recesses 16 the several lugs and spaces or recesses being of the same size.

Revolubly mounted on the shaft 5 adjacent the collar 13 is a pulley 17, the collars 7 holding the several parts in their proper relative positions. A cable 18 on the pulley 17 carries a suitable weight on one end and a dumbwaiter on the other, not shown.

Mounted at diametrically opposite points on the side of pulley 17 facing the housing 1 are a pair of double-acting dogs 19. Each dog is pivotally mounted on the pulley by a bolt as 20, and has a finger formed thereon extending inwardly toward the axis of the pulley as at 21. A recess is formed in the finger 21 as at 22, and in the recess is mounted a contact pin 23 held in contact with the plate 9 by means of a spring 24. The two arms 25 and 26 of the dog 19 extend in opposite directions from its pivotal point so as to overlie the stops 12 in plate 9.

Figure 2:
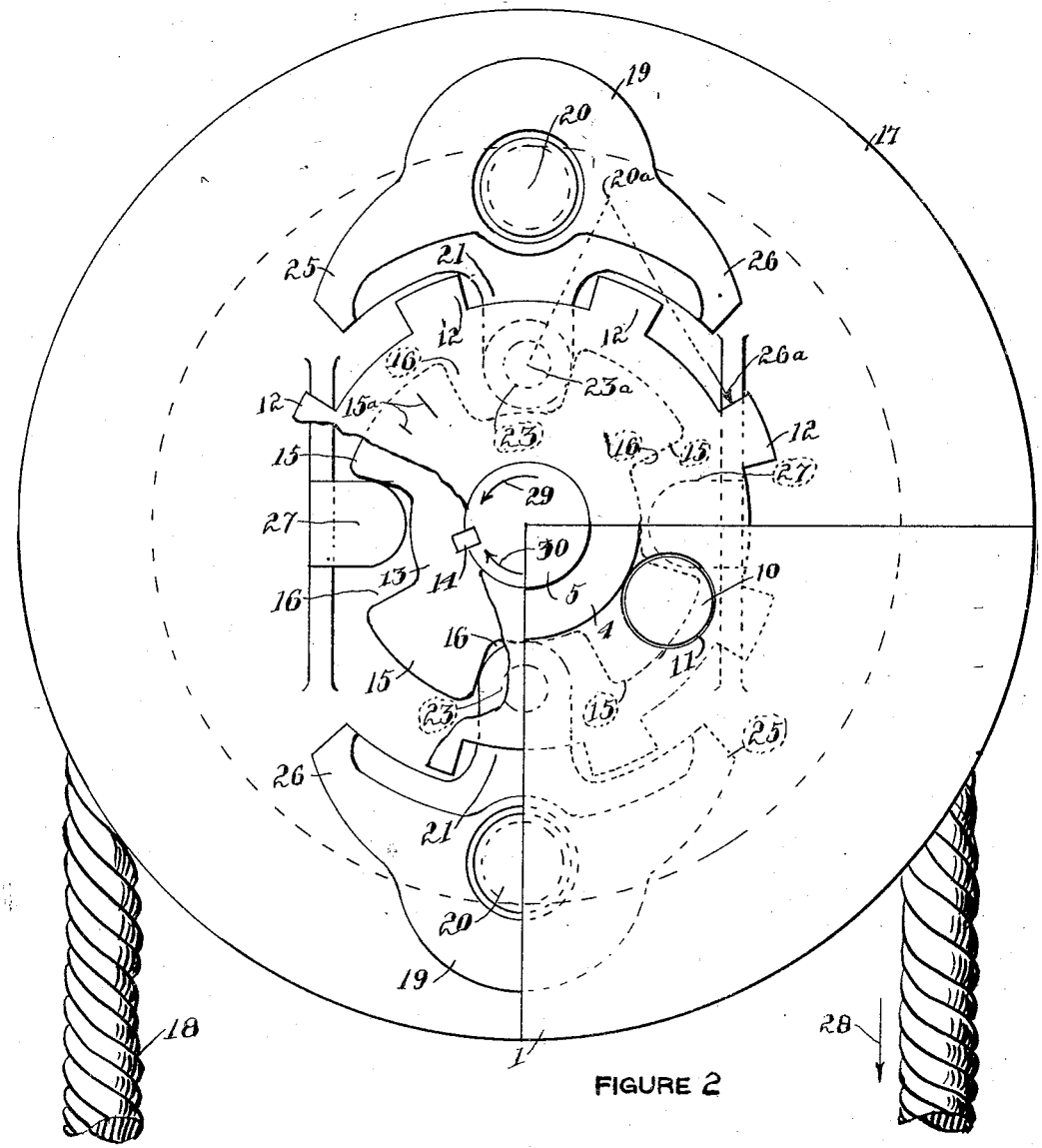
Figure 2 is an end view of the device, partly in elevation, part of the casing removed, and partly broken away.

Mounted upon the inner surface of pulley 17 as an integral part thereof are a pair of studs 27 positioned diametrically opposite each other and extending outwardly at right angles to the plane of the pulley and then laterally in parallel relation to the plane of the pulley and toward the axis of the same. These lugs are so positioned as to engage two of the recesses 16 in collar 13, while two fingers 21 of dogs 19 engage the other two recesses as clearly shown in Figure 2.

When there is no force applied to turn the shaft 5 the pulley 17 is automatically locked against turning in either direction. Under this condition there would always be an overbalancing of the pulley on one side or the other. When so unbalanced and the pulley starts to turn in the direction of the greater weight as indicated by the arrow 28, the frictional contact of the pin 23 with the fixed plate 9 swings the dog 19 mounted thereon about its pivot 20 so as to engage the adjacent stop 12 in plate 9 and the movement is arrested. While the center of pin 23 remains at 23a the center of bolt 20 moves to a point as 20a, thereby throwing the arm 26 into contact with a stop 12 as indicated at 26a. Since stud 27 on pulley 17 is in contact with a lug 15 the described movement of the pulley imparts a corresponding movement to collar 13 moving the lug 15 in advance of the pin 23 away therefrom, and the lug following up to the pin. This movement of the lug is indicated by the positions of the radial center line at 15a.

It is obvious now that if the shaft 5 is turned in either direction (to raise or lower a load), the pulley will be immediately unlocked and rotated. If it is desired to raise the weight then the shaft is turned in the direction indicated by arrow 29, whereupon the dog 19 assumes an inoperative position as shown and is held in this position by the collar and lug 13—15. Since there is also a collar and lug 13—15 engagement with the stud 27 the rotation of pulley 17 is coincident with the proper relative positioning of the dog 19 and stops 15. If it is desired to lower the weight and the shaft 5 is turned in the opposite direction as indicated by arrow 30, then the forced rotation of collar 13 and the lug 15 back of the finger 21 forces the dog into an inoperative position. The pulley may now rotate freely but the moment it rotates faster than the collar 13 the dog 19 is thrown into operation as described and the pulley is automatically locked again.

The pulley may be operated freely in either direction by means of a force applied to shaft 5, but a movement initiated through the pulley itself is automatically stopped and consequently under positive control.

It is to be understood, of course, that while I have herein shown and described but one specific embodiment of the invention, changes in form, construction and method of assembly and operation may be made within the scope of the appended claims.

I claim:

1. An elevator braking mechanism comprising, a plurality of annularly arranged fixed stops, a shaft revolubly mounted in concentric relation thereto, a pulley revolubly mounted on the shaft, a detent mounted on the pulley and engageable with said stops, whereby to prevent rotation of the pulley in either direction, and shaft actuated means for moving the detent into an inoperative position relative to the said stops, whereby to permit rotation of the shaft in either direction.

2. An elevator braking mechanism comprising a plurality of annularly arranged fixed stops, a shaft revolubly mounted in concentric relation thereto, a pulley revolubly mounted on the shaft, a detent mounted on the pulley and movable into and out of engagement with the said stops, a stop mounted on the pulley, and shaft actuated means engageable with the detent to move it into an inoperative position and engageable with the pulley stop to actuate the pulley.

3. A braking mechanism comprising, a plurality of annularly arranged fixed stops, a shaft revolubly mounted in concentric relation thereto, a pulley revolubly mounted on the shaft, a detent pivotally mounted on the pulley and movable into and out of engagement with the stops, a fixed plate disposed adjacent the pulley in parallel relation thereto, friction means carried by the detent and adapted to engage said plate whereby to swing the detent on its pivot upon relative movement of the pulley and plate, a plurality of annularly arranged stops mounted in concentric relation to the shaft and keyed thereto and inserted between the pulley and plate, and a stop on the pulley adapted to engage said last mentioned stops.

4. A braking mechanism comprising, a plurality of annularly arranged fixed stops, a shaft revolubly mounted in concentric relation thereto, a pulley revolubly mounted on the shaft, a detent mounted on the pulley and engageable with said stops, shaft actuated means for moving the detent into an inoperative position relative to the said stops, and means actuated by relative movement between the pulley and shaft for moving the detent into an operative position relative to said stops.

VINCENT J. WHITNEY.